Jan. 5, 1960

H. D. MENDEL 2,919,875

PALLET FOR HANDLING MATERIALS

Filed July 14, 1955

INVENTOR.
Herbert D. Mendel
BY Max R. Kraus
Attorney.

Jan. 5, 1960   H. D. MENDEL   2,919,875
PALLET FOR HANDLING MATERIALS
Filed July 14, 1955
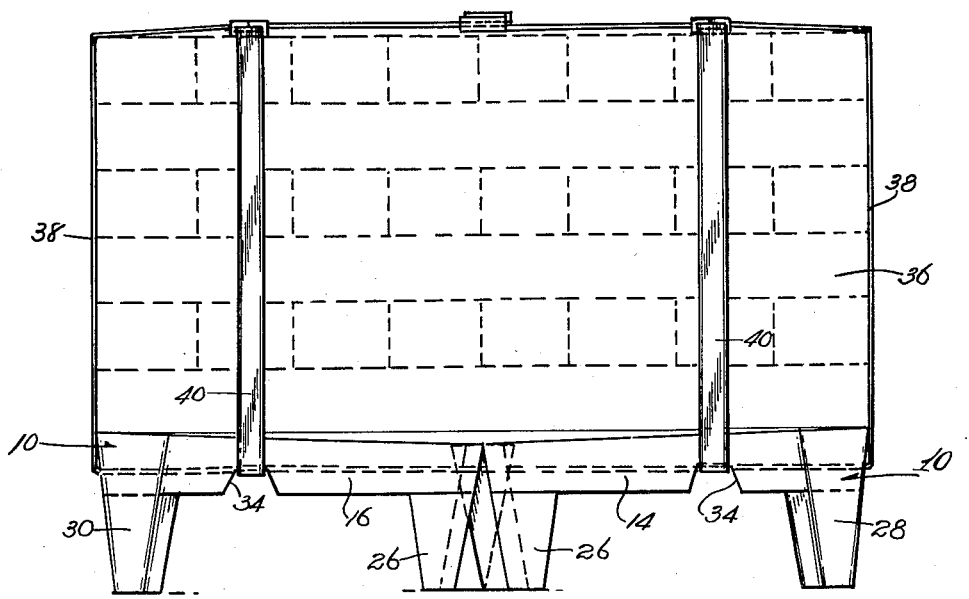
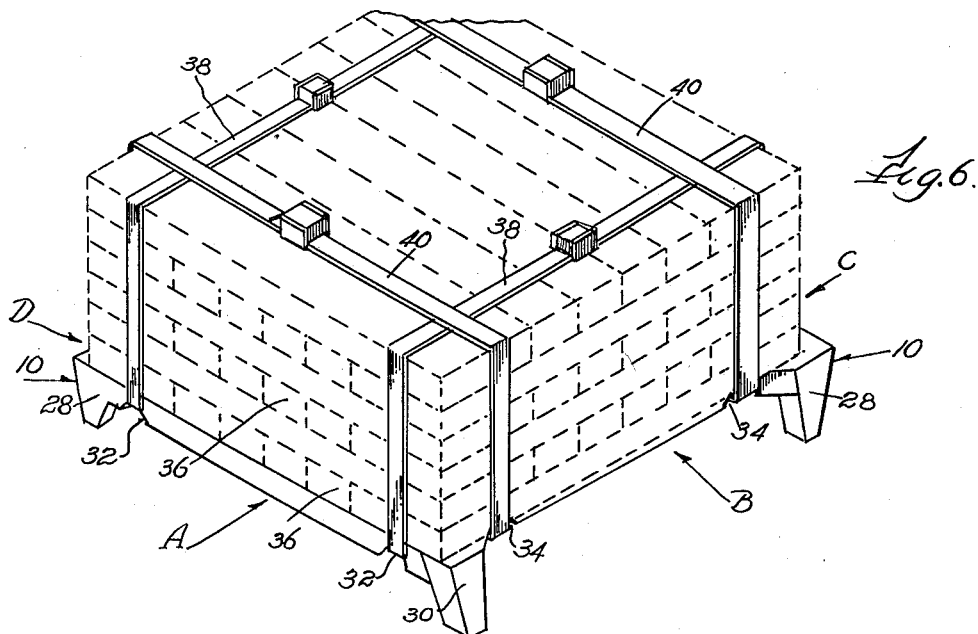

United States Patent Office 2,919,875
Patented Jan. 5, 1960

2,919,875

PALLET FOR HANDLING MATERIALS

Herbert D. Mendel, Benton Harbor, Mich.

Application July 14, 1955, Serial No. 522,082

4 Claims. (Cl. 248—120)

This invention relates to a pallet for handling materials.

One of the objects of this invention is to provide a platform made of a plurality of pallets on which ingots or bars are loaded and strapped to form a compact unit for shipment.

Another object is to provide a pallet for loading ingots or bars which pallet is made of the same material as the ingots or bars so that the pallet may be broken to form ingots.

Another object is to provide a pallet for loading ingots which is made of the same material as the ingots and which may be shipped with the ingots thereon and which platform is subsequently broken up to form ingots thereby eliminating any excess weight which would result in the use of loading platforms made of extraneous material and also eliminates the cost of such extraneous material which would be wasted.

Another object is to provide pallets which provide a platform for loading and transporting ingots or the like, which is accessible for lifting from the sides, ends or corners of the pallets or platform.

Other objects will become apparent as this description progresses.

In the drawings:

Fig. 5 is a side view of the pallets with ingots strapped thereon, and

Fig. 6 is a perspective view of the pallets and ingots strapped thereon.

Figure 1:
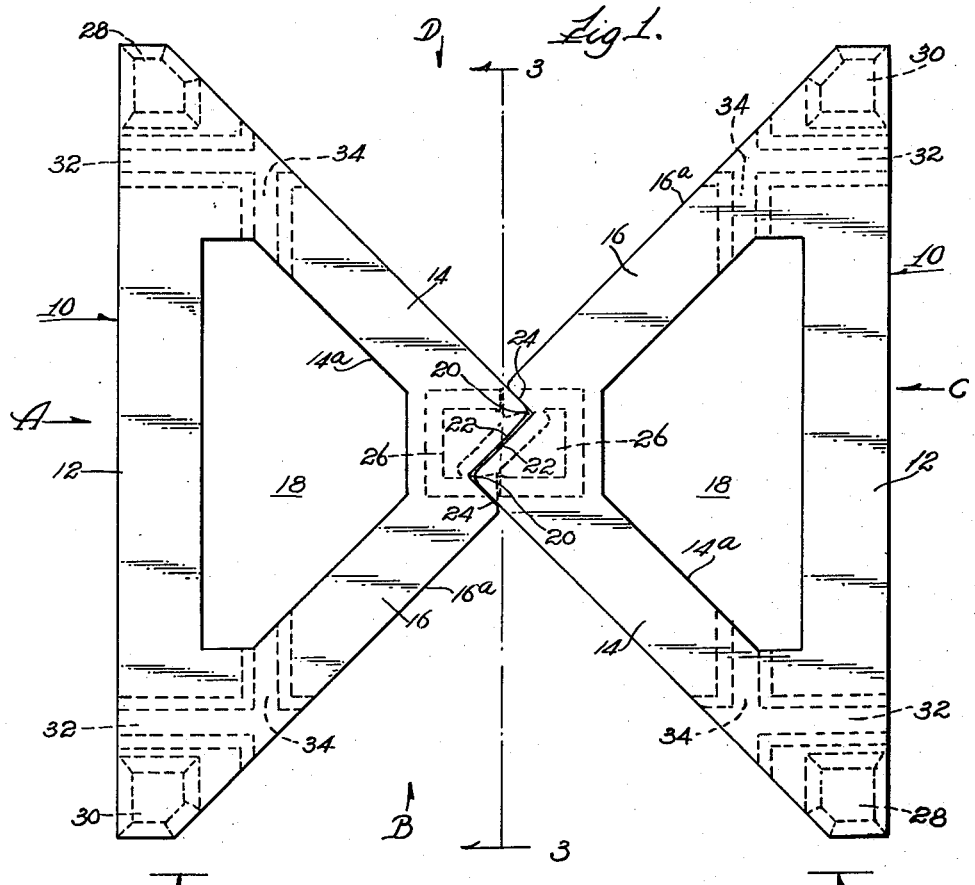
Fig. 1 is a top plan view of two pallets in position to receive the ingots.
Figure 2:
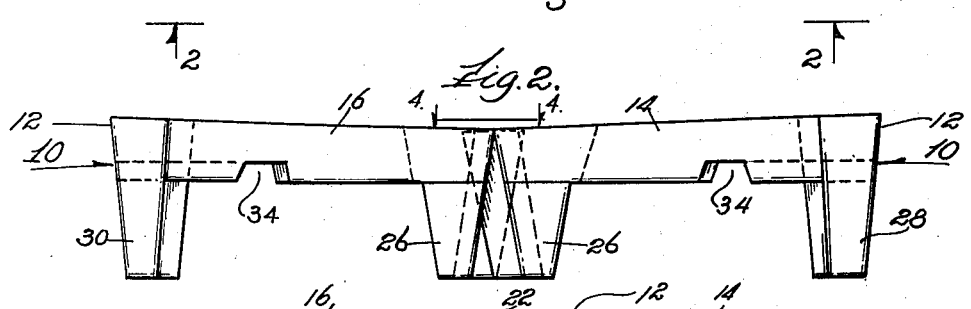
Fig. 2 is a side elevational view taken on lines 2—2 of Fig. 1.
Figure 3:
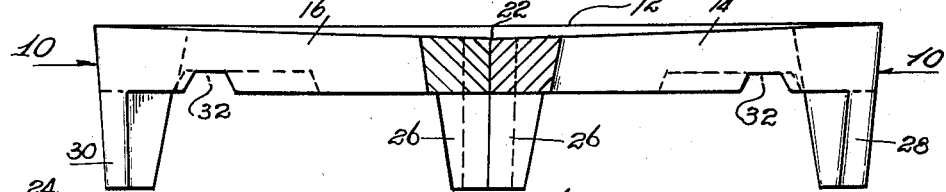
Fig. 3 is a view taken on lines 3—3 of Fig. 1.
Figure 4:
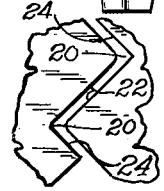
Fig. 4 is a view taken on lines 4—4 of Fig. 2.

The pallets are more clearly shown in Figs. 1 to 3, inclusive and are generally designated by the numeral 10.

While two pallets are used and are positioned adjacent each other as shown in Fig. 3, the pallets are of identical shape and construction and hence one will be described in detail. They are made of an alloy similar to the ingots or bars which are stacked thereon. The pallet is generally of triangular shape in plan, having an end section 12 and two side sections 14 and 16, which define an inner open area 18.

Adjacent the juncture of the two side sections 14 and 16 or vertex of the triangle there is a recessed portion 20 having a side 22 and an end 24 at right angles thereto. The side 22 is parallel with the side section 16 but spaced inwardly from the outer wall 16a of side section 16. End 24 is parallel with side section 14 and is in substantial alinement with the inner wall 14a of section 14.

The pallet is provided with 3 legs numbered 26, 28 and 30. The center leg 26 is formed adjacent the juncture of the two side sections 14 and 16 and adjacent the recessed portion 20, which leg is formed solid and is shaped as indicated in outline by the dotted lines in Fig. 1.

The side leg 28 is formed adjacent the juncture of the side section 14 and end section 12 and side leg 30 is formed adjacent the side section 16 and end section 12. The side legs are also formed solid and are shaped as indicated in outline by the dotted lines in Fig. 1. Each of the three legs incline or gradually taper inwardly towards the bottom.

Adjacent each of the side legs 28 and 30 there is provided grooves or channelled recesses 32 and 34. The channelled recesses 32 are formed on the underside of end section 12 inwardly of the legs 28 and 30 and extend transversely of the end section 12. The channelled recesses 34 are formed on the underside of the side sections 14 and 16 and at right angles to the recesses 32 and communicate therewith.

To form the platform for the ingots or bars, two pallets 10 are positioned in opposed relation as best shown in Fig. 3 to form a substantially X shape with closed end sections. The recessed portion 20 of each pallet is positioned adjacent each other so that the side 22 of the recess of one pallet is in juxtaposition to the side 22 of the other pallet and the end 24 of the recess of each pallet is in juxtaposition to a portion of the side section 14 of the opposing pallet. The two pallets thus being substantially intermeshed at their centers.

The upper surface of the pallet slopes slightly downwardly as best seen in Figs. 2 and 3 from the end section 12 towards the center of the pallet, consequently when the two pallets are positioned as shown in Fig. 3 the upper surfaces of the pallets incline towards the center of the platform. This puts weight on two straight lines at ends instead of one end and one central point in case both parts are not exactly the same height.

With the platform formed by positioning the pallets as shown, the ingots or bars generally indicated at 36 are positioned thereon and are stacked in tiers with the ingots on one tier all positioned in the same direction and with the ingots or bars of the next tier above all positioned transversely thereto and so on with each succeeding tier.

When all the tiers have been thus stacked metal straps are secured to bind the ingots and platform together. Two metal straps 38 are strapped around the two pallets and ingots with a portion of the straps in the channelled grooves 32 and the two straps 40 are strapped transversely thereto with a portion of the straps in the channelled grooves 34. The metal straps have the usual locking means. The channelled grooves 32 and 34 confine the straps in position and prevent side or end movement thereof.

When strapped the two pallets are interlocked with the ingots to form a compact unit for shipment which will not break during shipment.

With this invention the compact unit is readily accessible by a lift truck from 8 different positions, consequently irrespective of where the unit is temporarily stacked and stored it is readily accessible for lifting without moving adjacent stacked units.

The conventional lift truck which is used for lifting the stacked units has two forwardly extending forks or prongs which may be positioned under the stack and platform between any pair of legs. Thus same is accessible from all four sides of the stacked unit designated by the numerals A to D inclusive. However, if the stacked unit is inaccessible except through a corner of the stacked unit or an angular position, the two forks of the lift truck are angularly positioned between any one of the legs. Thus the forks will engage the underside of both pallets from an angular position such as between A and B or between B and C or between C and D or between D and A, thereby providing 4 additional corners of access for the fork truck.

After the stacked unit is delivered and the ingots or bars are removed, the pallets being of the same material as the ingots or bars are broken up along the grooved channels 32 and 34 to form ingots. Thus while the pallets serve as a platform for stacking and shipping they are also used as ingots thereby eliminating any extra wasted weight in the handling and shipment of extraneous shipping and packing material, and also eliminating the cost of such extraneous shipping and packing material. The pallets may be made at the place where the ingots or bars are made and require no special treatment.

It will be understod that various changes and modifications may be made without departing from the spirit and scope of the appended claims.

I claim:

1. A platform for handling ingots and formed of a pair of pallets, each of said pallets formed of a material from which the ingots are made and each having a substantially triangular shape and each having their apices provided with a stepped portion, with the stepped portions complementarily shaped to interfit, said pallets positioned in opposed relation to form said platform, said pallets each having their upper surfaces inclined downwardly in the direction of its apex, each pallet having a plurality of legs extending from the bottom of said pallet for spacing same from a supporting surface, one of said legs of each pallet being adjacent the apex of each pallet so that when the pallets are positioned in interfitting arrangement, said last mentioned legs are adjacent each other.

2. A platform for handling ingots and formed of a pair of pallets, each of said pallets formed of a material from which the ingots are made and each having a substantially triangular shape and each having their apices provided with a stepped portion with the stepped portions complementarily shaped to interfit so that the base sides of said pallets are parallel to each other, said pallets each having their upper surfaces inclined downwardly in the direction of its apex, each pallet having legs extending downwardly from the bottom of the pallet for spacing same from a supporting surface, the legs on each pallet being adjacent to each of the angles of the triangular shaped pallet.

3. A platform for handling ingots and formed of a pair of pallets, each of said pallets formed of a material from which the ingots are made and each having a substantially triangular shape and each having their apices provided with a stepped portion with the stepped portions complementarily shaped to interfit so that the base sides of said pallets are parallel to each other and the sides of said pallets form a substantially X shape in plan, each pallet having legs extending downwardly from the bottom of the pallet for spacing same from a supporting surface, the legs on each pallet being adjacent each of the angles of the triangular shaped pallets.

4. A platform for handling ingots and formed of a pair of pallets, each of said pallets formed of a material from which the ingots are made and each having a substantially triangular shape and each having their apices provided with a stepped portion with the stepped portions complementarily shaped to interfit so that the base sides of said pallets are parallel to each other and the sides of said pallets form a substantially X shape in plan, each pallet having a plurality of legs extending from the bottom of said pallet for spacing same from a supporting surface, one of said legs of each pallet being adjacent the apex of each pallet so that when the pallets are positioned in interfitting arrangement said last mentioned legs are adjacent each other.

References Cited in the file of this patent

UNITED STATES PATENTS

| 1,150,074 | Stevens | Aug. 17, 1915 |
| 2,420,625 | Stalnaker | May 13, 1947 |
| 2,828,932 | De Pew | Apr. 1, 1958 |

FOREIGN PATENTS

| 20,703 | Denmark | Nov. 1, 1915 |